US011270120B2

(12) United States Patent
Harris et al.

(10) Patent No.: US 11,270,120 B2
(45) Date of Patent: Mar. 8, 2022

(54) VISUAL OBJECT INSERTION CLASSIFICATION FOR VIDEOS

(71) Applicant: Mirriad Advertising PLC, London (GB)

(72) Inventors: Tim Harris, London (GB); Philip McLauchlan, London (GB); David Ok, London (GB)

(73) Assignee: MIRRIAD ADVERTISING PLC, London (GB)

( * ) Notice: Subject to any disclaimer, the term of this patent is extended or adjusted under 35 U.S.C. 154(b) by 251 days.

(21) Appl. No.: 16/740,197

(22) Filed: Jan. 10, 2020

(65) Prior Publication Data

US 2020/0226385 A1    Jul. 16, 2020

(30) Foreign Application Priority Data

Jan. 10, 2019   (EP) ..................... 19151222

(51) Int. Cl.
*G06K 9/62*        (2006.01)
*G06K 9/00*        (2022.01)
(Continued)

(52) U.S. Cl.
CPC ....... *G06K 9/00718* (2013.01); *G06K 9/6215* (2013.01); *G06K 9/6268* (2013.01); *G06N 20/00* (2019.01); *G06T 11/60* (2013.01)

(58) Field of Classification Search
CPC ............. G06K 9/00718; G06K 9/6215; G06K 9/6268; G06K 9/3233; G06K 9/00711;
(Continued)

(56) References Cited

U.S. PATENT DOCUMENTS

2006/0026628 A1*  2/2006  Wan ............... H04N 21/8456
                                                    725/32
2014/0156364 A1*  6/2014  Zalewski ......... H04N 21/23418
                                                    705/14.4
(Continued)

FOREIGN PATENT DOCUMENTS

EP    2 819 095 A1   12/2014
EP    3 379 837 A1    9/2018

OTHER PUBLICATIONS

European Patent Office, Exam Report for European Patent Application No. 18 191 297.3, dated Jan. 24, 2020. 4 pages.
(Continued)

*Primary Examiner* — Solomon G Bezuayehu
(74) *Attorney, Agent, or Firm* — SoCal IP Law Group LLP; Jonathan Pearce

(57) ABSTRACT

The present disclosure relates to a computer implemented method, computer program and apparatus for classifying object insertion opportunities in a video by identifying at least one object insertion opportunity in a scene of the video, identifying a focus of attention in the scene, determining a proximity value for each of the at least one object insertion opportunity based at least in part on the object insertion opportunity and the focus of attention, wherein the proximity value is indicative of a distance between the respective at least one object insertion opportunity and the focus of attention in the scene, and classifying each of the at least one object insertion opportunity based at least in part on the proximity value determined for each respective at least one object insertion opportunity.

17 Claims, 7 Drawing Sheets
(3 of 7 Drawing Sheet(s) Filed in Color)

(51) Int. Cl.
*G06N 20/00* (2019.01)
*G06T 11/60* (2006.01)

(58) Field of Classification Search
CPC .... G06N 20/00; G06T 11/60; G06Q 30/0276; H04N 5/2723
See application file for complete search history.

(56) References Cited

U.S. PATENT DOCUMENTS

| | | | |
|---|---|---|---|
| 2015/0095882 A1* | 4/2015 | Jaeger | G06F 8/34 717/109 |
| 2016/0142747 A1* | 5/2016 | He | H04N 5/2723 725/34 |
| 2017/0097807 A1* | 4/2017 | Park | G06F 3/016 |
| 2017/0278308 A1* | 9/2017 | Bleiweiss | G06K 9/00664 |
| 2018/0020247 A1* | 1/2018 | Zhang | G06Q 30/0241 |
| 2018/0061057 A1* | 3/2018 | Farre Guiu | G06K 9/00718 |
| 2020/0120369 A1* | 4/2020 | Oz | H04N 21/23418 |
| 2020/0213644 A1* | 7/2020 | Gupta | G06Q 30/0273 |
| 2021/0193182 A1* | 6/2021 | Gilley | H04N 21/4223 |
| 2021/0217443 A1* | 7/2021 | Abraham | G06N 3/08 |

OTHER PUBLICATIONS

Lin, Liang et al. "Deep Structured Scene Parsing by Learning with Image Descriptions," ARXIV.org, Cornell University Library, 201 Olin Library Cornell University Ithaca, NY 14853, Apr. 8, 2016, XP081352192.

European Patent Office, Extended European Search Report for European Patent Application No. 1915122, dated Jul. 17, 2019.

Huiying Liu et al: "@ICT: attention-based virtual content insertion", Multimedia Systems, Springer, vol. 18, No. 3, Apr. 28, 2011. pp. 201-214. Berlin, Germany.

Huiying Liu et al: "A Generic Virtual Content Insertion System Based on Visual Attention Analysis", ACM Multimedia, Proceedings of the International Conference (MM '08), Oct. 26, 2008, pp. 379-388. ACM Press, New York, NY.

* cited by examiner

310

325  320

VISUAL OBJECT INSERTION CLASSIFICATION FOR VIDEOS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority to a counterpart European Patent Application number EP19151222.7 with the same title, filed Jan. 10, 2019 and assigned to the same assignee.

TECHNICAL FIELD

The present disclosure relates to methods, systems and computer programs for classifying object insertion opportunities in a video.

BACKGROUND

With the advent of digital file processing, it is possible to digitally insert visual objects into a video. In order to digitally insert a visual object into a video, first an opportunity for digital object insertion must be identified. That opportunity must then be evaluated to determine its suitability for object insertion, for example based on the value or benefit of digitally inserting the object. If it is decided that the opportunity is suitable, for example there is sufficient benefit or value in inserting the digital object into the video, the process of digital object insertion may then begin.

Digitally inserting objects in a video may have many benefits, for example enhancing the visual effects of the video, or improving the realism of a video, or allowing more flexibility for the video after it is shot meaning that fewer decisions need to be made during the filming of scenes. Consequently, digital object insertion is becoming increasingly common and utilised by video makers for all manner of purposes.

However, not every object insertion opportunity is worth using. For example, in some instances there may be 100s or 1000s of opportunities for inserting objects into a video (particularly for long videos, such as films). Most of those opportunities may not be deemed suitable for object insertion, for example because they are not sufficiently visible to viewers, or lack sufficient impact or benefit. Often, just a handful out of 100s or 1000s of opportunities, may be worth taking forward for visual object insertion. Filtering suitable opportunities (for example, those opportunities that may enhance a scene of the video, or increase viewer impact, etc.) from all of the digital object insert opportunities can be a time consuming and labour intensive process, requiring evaluation of each identified opportunity by human operators. It might also involve a degree of subjective analysis, which may cause inconsistency in evaluation between different operators, or even inconsistencies in evaluation from the same operator at different times. As digital object insertion becomes increasingly common, existing analysis and evaluation techniques have an increasingly detrimental effect on resource efficiency, particularly for videos of significant length, such as films or episodes/shows of television programs. Therefore, a more efficient and consistent approach to the identification of suitable object insertion opportunities is desired.

SUMMARY

In a first aspect of the present disclosure, there is provided a computer implemented method for classifying potential object insertion opportunities in a video, the method comprising: identifying, by analysing a plurality of pixels in each of one or more frames in a scene of the video, at least one potential object insertion opportunity in a scene of the video, wherein each potential object insertion opportunity represents an opportunity to digitally insert one or more visual objects into an image content of the scene; identifying, by analysing the plurality of pixels in each of the one or more frames in the scene of the video, a focus of attention in the scene, wherein the focus of attention represents a part of the scene that is likely to draw a viewer's focus of attention; determining a proximity value for each of the at least one potential object insertion opportunity based at least in part on a region of the scene covered by the potential object insertion opportunity and a region of the scene covered by the focus of attention, wherein the proximity value is indicative of a distance between the respective at least one potential object insertion opportunity and the focus of attention in the scene; and classifying each of the at least one potential object insertion opportunity based at least in part on the proximity value determined for each respective at least one potential object insertion opportunity.

Classifying each of the at least one potential object insertion opportunity may comprise classifying each of the at least one potential object insertion opportunity as a candidate object insertion opportunity or a rejected object insertion opportunity.

Classifying each of the at least one potential object insertion opportunity may further comprise determining an impact value for each candidate object insertion opportunity based at least in part on its associated proximity value.

Determining the proximity value may further comprise: determining a value for a distance parameter based on the region of the scene covered by the respective at least one potential object insertion opportunity and the region of the scene covered by the focus of attention; and determining the proximity value based at least in part on the value for the distance parameter.

The distance parameter may comprise a two dimensional relative distance between the region of the scene covered by the respective at least one potential object insertion opportunity and the region of the scene covered by the focus of attention.

Additionally, or alternatively, the distance parameter may comprise a three dimensional relative distance between the region of the scene covered by the respective at least one potential object insertion opportunity and the region of the scene covered by the focus of attention.

Additionally, or alternatively, the distance parameter may comprise a relative depth between the region of the scene covered by the respective at least one potential object insertion opportunity and the region of the scene covered by the focus of attention.

Additionally, or alternatively, the distance parameter may comprise a scale (such as a scale of 0-4) indicative of a distance between the region of the scene covered by the respective at least one potential object insertion opportunity and the region of the scene covered by the focus of attention. Determining the value of the distance parameter may comprise using an artificial intelligence (AI), for example comprising one or more AI or machine learning algorithms, trained using a corpus of training images, wherein each of the training images comprises a focus of attention, at least one potential object insertion opportunity and, for each potential object insertion opportunity, a value on the scale.

The distance between the respective at least one potential object insertion opportunity and the focus of attention in the scene may comprise one or more of: a) a distance between a centre of gravity of the respective potential object insertion opportunity and a centre of gravity of the focus of attention; b) a distance between a centre of gravity of the respective potential object insertion opportunity and an edge of the focus of attention; c) a distance between an edge of the respective potential object insertion opportunity and a centre of gravity of the focus of attention; d) a distance between an edge of the respective potential object insertion opportunity and an edge of the focus of attention.

The edge of the potential object insertion opportunity may be the edge of the potential object insertion opportunity that is closest to the focus of attention and the edge of the focus of attention may be the edge of the focus of attention that is closest to the respective potential object insertion opportunity.

The analysis of the plurality of pixels in each of the one or more frames in the scene to identify the focus of attention may comprise facial recognition.

At least part of determining a proximity value for each of the one or more potential object insertion opportunities may comprise using an AI algorithm trained using a corpus of training images, wherein each of the training images comprises a focus of attention, at least one potential object insertion opportunity and a corresponding at least one proximity value.

In a second aspect of the present disclosure, there is provided a computer program comprising instructions which, when the program is executed by a computer cause the computer to carry out the method of the first aspect.

In a third aspect of the present disclosure, there is provided a data processing system comprising at least one processor configured to perform the method of the first aspect.

In a fourth aspect of the present disclosure, there is provided a method of training an AI algorithm to determine a value for a distance parameter for at least one potential object insertion opportunity in a video, the method comprising: obtaining a plurality of images, each image comprising data indicative of: a focus of attention in the visual content of the image; at least one potential object insertion opportunity in the visual content of the image, wherein each potential image object insertion opportunity represents an opportunity to digitally insert one or more visual objects into the image; and a corresponding value for the distance parameter for each of the at least one potential object insertion opportunity, wherein the distance parameter is indicative of a distance between the respective at least one potential object insertion opportunity and the focus of attention in the scene; and using the plurality of images as a training corpus to train the AI algorithm to determine values for the distance parameter for potential object insertion opportunities in scenes of videos comprising at least one potential object insertion opportunity and a focus of attention.

In a fifth aspect of the present disclosure, there is provided an AI algorithm trained using the method of the fourth aspect.

In a sixth aspect of the present disclosure, there is provided a computer implemented method for classifying potential object insertion opportunities in a video, the method comprising: obtaining object insertion data comprising: one or more frames of a scene of the video; data indicative of at least one potential object insertion opportunity in the scene of the video, wherein each potential image object insertion opportunity represents an opportunity to digitally insert one or more visual objects into an image content of the scene; and data indicative of a focus of attention in the scene, wherein the focus of attention represents a part of the scene that is likely to draw a viewer's focus of attention; determining a proximity value for each of the at least one potential object insertion opportunity based at least in part on a relative distance between the respective at least one potential object insertion opportunity and the focus of attention in the scene; and classifying each of the at least one potential object insertion opportunity based at least in part on the proximity value determined for each respective at least one potential object insertion opportunity.

In a seventh aspect of the present disclosure, there is provided a classification module configured to perform the steps of the sixth aspect.

DESCRIPTION OF THE DRAWINGS

The patent or application file contains at least one drawing executed in color. Copies of this patent or patent application publication with color drawing(s) will be provided by the Office upon request and payment of the necessary fee.

Aspects of the present disclosure are described, by way of example only, with reference to the following drawings, in which.

DETAILED DESCRIPTION

This disclosure relates to the digital insertion of one or more visual objects into the image contents of a scene of a video. This typically involves inserting a visual object into one or more frames that make up the scene of the video.

Figure 1:
FIG. 1 shows an example still image from a scene of a video, with and without an inserted visual object.
Figure 1:

FIG. 1 shows an example still image 110 from a scene of a video. FIG. 1 also shows an example still image 120 that shows the same scene, but with a visual object 125 inserted into the image content of the scene. As can be seen, the visual object 125 is inserted to appear as though it is part of the scene, such that a viewer may not realise that the visual object 125 has been digitally inserted into the scene after the scene was filmed. Instead, the visual object 125 may appear as though it were part of the scene when the scene was originally filmed.

There may be many reasons for digitally inserting objects into videos, and many contexts in which it may be desired. In some instances, it may be desirable in order to enhance visual effects. In other instances, it may be desirable in order to include additional items in the video that were not contemplated at the time of recording the video. In other instances, particular products may be inserted in order to function as a form of advertising. Regardless of context or purpose, there may be value and/or a number of benefits in digitally inserting objects into videos, but the process of identification and evaluation of opportunities can be inefficient and inconsistent.

A video may comprise a series of 'shots'. The shots may be delineated by cuts, where the camera stops recording, or where the video material is edited to give this impression. In a 'pre-analysis pass', scenes within a video may be identified, particularly scenes shot from the same camera position. It has been known for many years how to segment a video into scenes automatically, using shot change detection. This pre-analysis may include many other processes, and may result in a sorting process where all similar shots, or shots of the same locale, are presented together. Similar shots, or shots from the same locale, where insertion opportunities are relevant and presented together are sometimes referred to as an 'Embed Sequence'.

Figure 2:
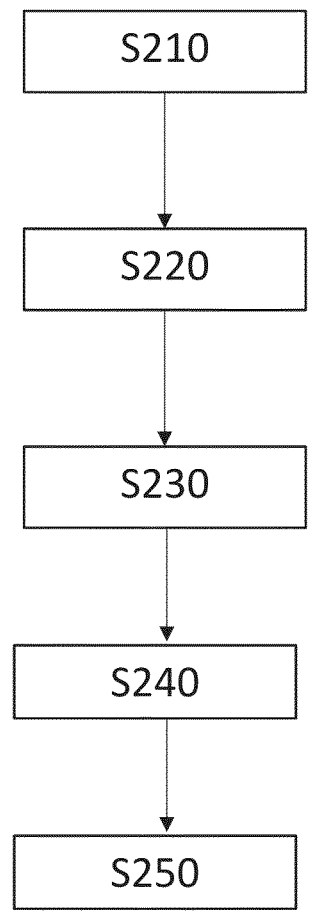
FIG. 2 shows a visualisation of example method steps in accordance with an aspect of the present disclosure.

FIG. 2 shows a visualisation of example method steps in accordance with an aspect of the present disclosure. In step S210, one or more n object insertion opportunities in a scene of a video are identified by analysing a plurality of pixels in each of one or more frames in a scene of a video. For example, just one representative frame of a scene may be analysed, or a plurality of frames (such as, one at the start, one at the middle and one at the end of the scene) may be analysed. A object insertion opportunity may typically be a surface within the image content of a scene, such as a kitchen worktop, or a table, or a wall, onto which a visual object may be inserted (such as a soda can, or a poster, or a television screen). Alternatively, an object insertion opportunity may itself be an object that appears within the image content of a scene, such as a soda can, or a bag of coffee, etc., which may be altered by a digitally inserted visual object, for example to change the branding of the identified object. A object insertion opportunity is an region of the image content of the scene that has been identified as having the for visual object insertion, for example because that area of the scene is a table surface, etc., but has not been further analysed to determine how good that opportunity may be. Step S210 may be carried out using any suitable image analysis techniques, and may optionally utilise artificial intelligence (AI) techniques. Details of how step S210 may be performed are not the subject of the present disclosure and shall not be described further, but the skilled person will be aware of the different techniques that maybe used.

Figure 3:
FIG. 3 shows an example still image from a scene of a video, with and without a visualisation of a region of the scene that is covered by an object insertion opportunity.
Figure 3:

FIG. 3 shows an example still image 310 from a scene of a video, which corresponds to the still image 110 represented in FIG. 1. FIG. 3 also shows an example still image 320 that shows the same scene, but includes a visualisation of a region of the scene that is covered by an object insertion opportunity 325 that has been identified in the scene. In this example, the object insertion opportunity 325 is a wall surface within the image content of the scene.

Previously, an object insertion operator or artist would review all of the identified opportunities in a scene, or in a collection of scenes of a video, and determine how suitable each opportunity is. Object insertion opportunities that are deemed to be suitable may be classified as candidate object insertion opportunities, which may then be taken forward for further analysis (for example, to select a visual object for insertion) and/or visual object insertion. Object insertion opportunities that are deemed to be unsuitable may be classified as rejected object insertion opportunities and discarded from further analysis and/or image processing. However, this analysis can be time consuming and can result in inconsistent classification between different operators and/or from the same operator at different times. Furthermore, incorrect classification can be problematic. For example, mis-classifying an opportunity as a candidate object insertion opportunity may result in wasted further analysis and/or image processing. Mis-classifying an opportunity as a rejected object insertion opportunity may result in a missed opportunity for visual object insertion.

The inventors have studied the classification process and determined that a number of different factors may be considered when classifying object insertion opportunities. They have realised that one significant factor is the proximity of the object insertion opportunity to the focus of attention of a scene. The focus of attention in a scene is the part of the scene that is likely to draw a viewer's focus of attention, for example the part of the scene that the viewer is being encouraged to look at. For example, it may be the lead actor in the video, or some other significant character within the video, or an object within the video. The inventors have realised that visual objects that are inserted in close proximity to the focus of attention are likely to be more visible to a greater range of viewers. For example, since the focus of attention is likely to be optically in focus (i.e., not blurred), a visual object inserted in close proximity to the focus of attention is also likely to be optically in focus. Consequently, viewers are more likely to see the insert visual object clearly and sharply. For example, viewers with a greater range of different eye sights and/or viewing across a wider range of distances from the screen, are likely to be able to see the inserted object clearly. Furthermore, an inserted visual object that is closer to the focus of attention is more likely to be seen by viewers by virtue of being in the area of the scene that they are most likely to be looking at. Conversely, visual objects that are inserted in distant proximity to the focus of attention are less likely to be seen (or seen clearly) by viewers. The likelihood that an inserted object will be seen clearly may affect how suitable an object insertion opportunity is. In some instances, for example product placement for advertising, it may be desirable to have the inserted visual object clearly visible to as many viewers as possible. In other instances, for example addition of background objects to add texture to a scene without diverting the viewer's attention, it may be desirable not to have the visual object so clearly or sharply visible.

Based on this realisation, the inventors have developed a technique for classifying object insertion opportunities based at least in part on the proximity of the object insertion opportunity and the focus of attention in the scene.

Figure 4:
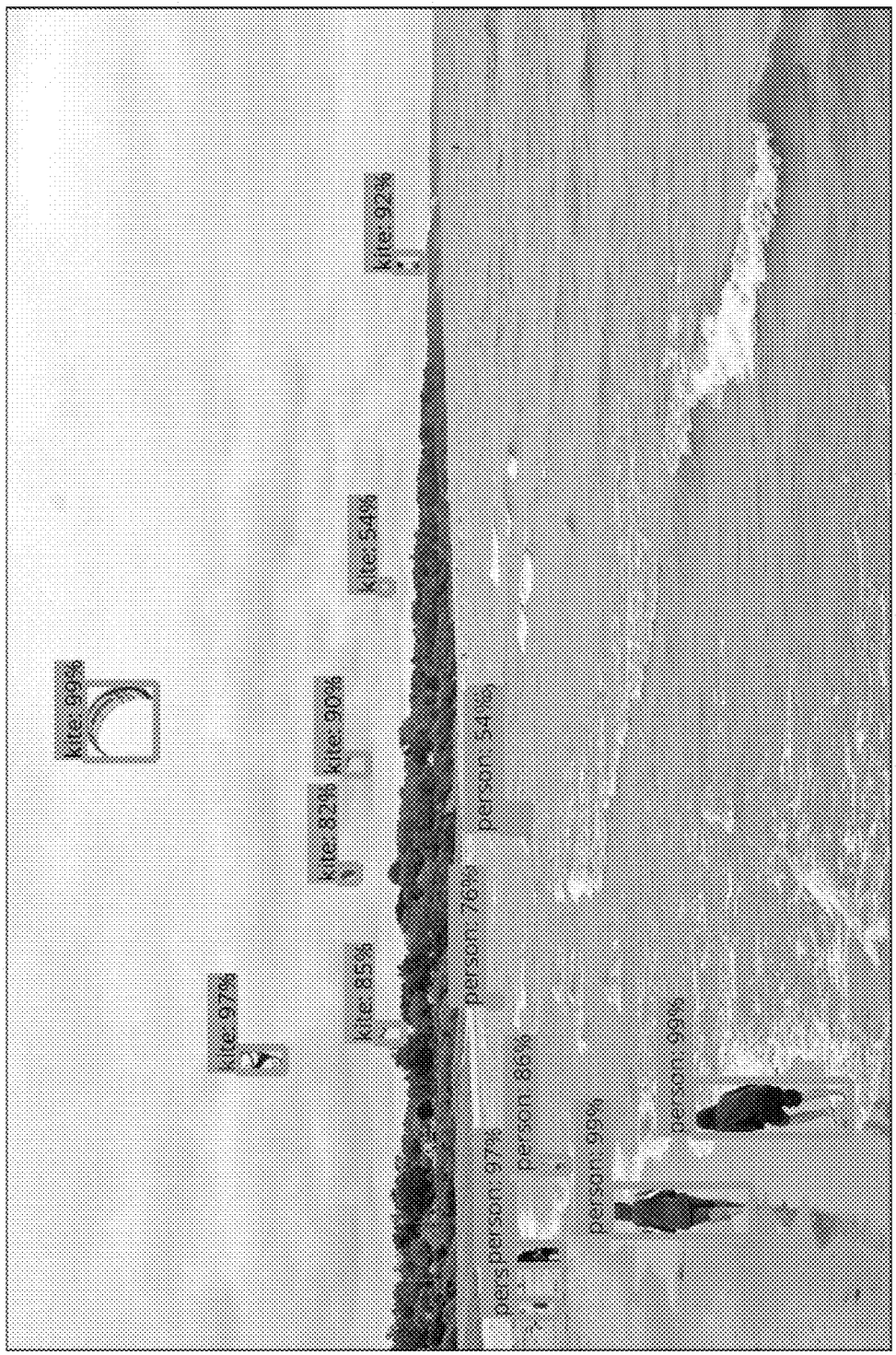
FIG. 4 shows an example image from a scene on which object detection has been performed using TensorFlow.

Returning to FIG. 2, having identified at least one object insertion opportunity in a scene in Step S210, in Step S220 the plurality of pixels in the one or more frames of the scene are analysed to identify the focus of attention in the scene. There are a number of different ways in which this identification may be performed. For example, object detection may be performed on the image content of the scene to identify humans and/or objects (such as buildings, cars, bottles, etc.) within the scene. In one example, the Tensor-Flow™ suite of open source software may be used for object detection. FIG. 4 shows an example image from a scene on which object detection has been performed using TensorFlow. In this example, the focus of attention may be determined to be any humans that are identified (optionally the human taking up the largest area of the frame), or if no humans are identified, the focus of attention may be determined to be any identified large objects (optionally the object taking up the largest area of the frame) such as a car or a building. Additionally or alternatively, face detection may be employed (potentially also using the TensorFlow, or any other suitable face detection tool, for example using other AI based tools). By searching for the lead character in the film, (for example James Bond in 007 movies, or Han Solo in Star Wars movies), the focus of attention may be more reliably determined. Additionally, or alternatively, the optical focus of the image may be considered, since the focus of attention is likely to be in focus. Additionally, or alternatively, an AI algorithm trained on a corpus of images having a focus of attention labelled on the images may be used. Additionally, or alternatively, any other suitable technique may be used.

In Step S230, a proximity value is determined for each of the earlier identified object insertion opportunities. Each proximity value is determined based at least in part on a region of the scene covered by the object insertion opportunity and a region of the scene covered by the focus of attention, and is indicative of a relative distance between the object insertion opportunity and the focus of attention in the scene. The proximity value may take a variety of different forms depending on the particular implementation, as described below. In one particular implementation, Step S230 may be performed at least in part by an AI algorithm that has been trained using a corpus of training images, as described later.

In Step S230, a value for a distance parameter may be determined based on the region of the scene covered by object insertion opportunity and the region of the scene covered by the focus of attention. In one example, the distance parameter comprises a two-dimensional distance between the region of the scene covered by the object insertion opportunity and the region of the scene covered by the focus of attention. For example, the two-dimensional distance between the object insertion opportunity having co-ordinates in the scene and the focus of attention having co-ordinates $(x_2, y_2)$ in the scene may be determined by trigonometry:

$$\text{Relative two-dimensional distance} = \sqrt{(x_2-x_1)^2 + (y_2-y_1)^2}$$

where $(x_2-x_1)$ represents the horizontal distance and $(y_2-y_1)$ represents the vertical distance.

In this example, the co-ordinates for the region of the scene covered by the object insertion opportunity may be the centre of gravity of the region of the scene covered by the object insertion opportunity, or the centre of gravity of a region of the scene covered by a visual object to be inserted into the object insertion opportunity, or an edge of the region of the scene covered by the object insertion opportunity, or an edge of the region of the scene covered by the visual object to be inserted into the object insertion opportunity, where the edge may be the edge that is closest to the focus of attention in the scene. In the case where a particular object to be inserted is considered, the object itself may be digitally placed within the scene during this process, or a representation of the area that would be taken up by the object within the scene (for example, a 'blue box') may be used.

The co-ordinates for the focus of attention may be the centre of gravity of the region of the scene covered by the focus of attention, or an edge of the region of the scene covered by the focus of attention, wherein the edge may be the edge that is closest to the object insertion opportunity. Where the focus of attention is a person, the co-ordinates of the focus of attention may be a point on one of the hands of the person, or a point on their face, as these may be the parts of the person that are most likely to grab the viewer's attention, or they may be any other suitable point on the person.

In a further example, the distance parameter may comprise a three-dimensional distance between the region of the scene covered by the object insertion opportunity and the region of the scene covered by the focus of attention. Relative depth within the scene may be determined in a number of different ways, for example the technique described in K. Karsch, C. Liu and S. B. Kang, "Depth Extraction from video using non-parametric sampling", proceedings of the $12^{th}$ European conference on Computer Vision—Volume V, pp. 775-778 (2012).

Trigonometry can then be used to determine the three-dimensional distance. For example, if the region of the scene covered by the object insertion opportunity has a depth coordinate $z_1$ and the region of the scene covered by the focus of attention has a depth coordinate of $z_2$, the relative three-dimensional distance may be found as follows:

$$\text{Relative three-dimensional distance} = \sqrt{(x_2-x_1)^2 + (y_2-y_1)^2 + (z_2-z_1)^2}$$

As with the two-dimensional example, the co-ordinates used for the determination of a value for the three-dimensional distance may relate to any suitable part of the region of the scene covered by the object insertion opportunity and the region of the scene covered by the focus of attention.

Optionally, a weighting may be applied to one or more of the dimensions used. For example, it has been realised that typically the relative depth within the scene may have a large effect on the visual clarity of an inserted visual object. A visual object that is inserted into the background may be clearly seen by fewer viewers (for example, only to viewers with excellent eye sight and/or viewing the scene up close) whereas one inserted into the foreground may be seen more clearly by a larger proportion of viewers. Therefore, the z-dimension component may be weighted to have a greater effect on the value determined for the distance parameter than the other dimensions. It can therefore be appreciated that the distance parameter is not necessarily an absolute measure of distance, but may instead be any sort of parameter that is indicative of relative distance and is useful in the classification of the object insertion opportunities.

The proximity value may be set to the determined value of the distance parameter, or some other value that is based at least in part on the determined value of the distance parameter. Optionally, the proximity value may be determined based at least in part on the values determined for distance parameters relating to different parts of the object insertion opportunity and the focus of attention, for example based on the two dimensional distance of the centre of gravity of the object insertion opportunity and the centre of gravity of the focus of attention, and the three dimensional distance between the centre of gravity of an object to be inserted in the object insertion opportunity and an edge of the focus of attention (for example, an average of those two distance measurements, or any other suitable combination of the different distance measurements), etc.

In a further example, an AI algorithm, such as a machine learning algorithm, may be utilised for at least part of the determination of the proximity value.

For example, the AI module may be trained on a corpus of training images, each training image comprising a focus of attention, at least one object insertion opportunity and a corresponding value for a distance parameter. For example, the distance parameter may be a scale that is indicative of the relative distance between the region of the scene covered by the object insertion opportunity and the region of the scene that is covered by the focus of attention. It may be a parameter whose value is traditionally determined by a human, for example the parameter may be a numerical scale, such as between 0-4, where the scale indicates the following:

0—object insertion opportunity is outside of immediate scene

1—object insertion opportunity is in the background of the scene

2—object insertion opportunity is in the foreground of the scene

3—object insertion opportunity is close to the focus of attention

4—object insertion opportunity is touching the focus of attention

It will be appreciated that this is merely one example format for the numerical scale. The numerical scale may comprise any number of values, each of which may indicate a distance relationship between the object insertion opportunity and the focus of attention. In an alternative, the scale may not be a numerical scale, but may instead be a list of descriptors used by to describe the relative distance, for example.

In another particular example, each training image may comprise an image annotated with a blue box (i.e., a region of interest suitable for digital object insertion) and a corresponding proximity value (such as a value on the numerical scale above), as determined by a human operator. The AI algorithm may learn a proximity value function by leveraging the relationship between the objects identified in the scene, which may form the focus of interest, and the blue box.

One approach to estimate the proximity value is to exploit a depth estimator and an object detector. We may combine their output by using a fully Convolved Neural Network (CNN) approach. Let us recall that CNNs automatically learn the features needed to describe relationships between the objects in the image and the blue box. In contrast, other learning methods may require the AI practitioner to hand-engineer features to describe such relationships, since they may be less expressive than those automatically learnt by a CNN approach. Both learning methods may be based on deep neural network architecture.

For example, for a given image, the depth estimator may estimate a depth value '$z(u, v)$' for every pixel '$(u, v)$' of the image. Thus, the depth estimator may return a dense depth map for a given image. See for example "Unsupervised Monocular Depth Estimation with Left-Right Consistency", Clement Godard, Oisin Mac Aodha and Gabriel J. Brostow, Proceedings of Conference on Computer Vision and Patter Recognition (CVPR), 2017.

Object detectors, such as 'Mask-RCNN' (Mask R-CNN, Kaiming He, Georgia Gkioxari, Piotr Dollár, Ross Girshick), may detect and segment object instances of interest such as 'person', 'dog', 'TV'. For a given image, and return a set of segmentation corresponding to one object instance, for example, a first 'person' instance segmentation mask, a second 'person' instance segmentation mask, one 'dog' segmentation mask, and so on.

In our particular example, the input may be the pair '(x, y)' where: 'x' is a tensor that encodes the depth map and segmentation masks of objects, and 'y' is a proximity vector.

Specifically if 'd' is a depth map of size '(W, H)' and there is 'K' detectable object classes by the object detector, then 'x' is a tensor of shape '(K+1, W, H)' resulting from the stacking of:
 the depth map calculated by the depth estimator;
 the fused segmentation masks of object instances of the same class 'k'.

The proximity vector 'y' may be a 5D-vector where every entry is zero but for one index 'i' corresponding to proximity value 'i'.

The task then may be to learn a function 'x->CNN(x; theta)' parameterized by 'theta' and that calculates a proximity probability vector very close to the true proximity vector 'y' by using a cross-entropy loss function.

A good CNN architecture may be a ResNet backend followed by a perceptron layer, such as that described in "Deep Residual Learning for Image Recognition", Kaiming He, Xiangyu Zhang, Shaoqing Ren and Jian Sun, Proceedings of Conference on Computer Vision and Patter Recognition (CVPR), 2016.

The corpus of training images may comprise 100s, 1,000s, 10,000s, 100,000s, 1,000,000s of such training images. Whilst there may be a degree of subjectivity in the human setting of the value on the scale for each training image, over the entire training corpus the AI algorithm should learn the trends in the image contents that result in particular values being assigned. Therefore, by training the AI algorithm on such a training corpus, the AI module will learn to determine a value on the scale for each of the object insertion zones. In one implementation, the proximity value may simply be set to a determined value on the scale. In another implementation, the proximity value may be determined based on the determined value on the scale and any other suitable data, for example values determined for one or more other distance parameters such as the two-dimensional and/or three-dimensional relative distances determined as described above.

By using an AI module as described above, the improved classification may be realised without incurring the analysis inefficiency and inconsistency that accompanies human analysis of the scenes in a video. Thus, a video may be analysed and its object insertion opportunities classified efficiently and consistently.

In all of the different examples above, the proximity value may further be determined based on any one or more of the following: the position of the object insertion opportunity within the frame, the position of the focus of attention within the frame, the size of the object insertion opportunity and/or the characteristics of the focus of attention (for example, person, lead character, secondary character, object, etc.).

In Step S240, each of the object insertion opportunities is classified based at least in part on the proximity value determined in Step S230. The classification may take any suitable form, depending on the particular implementation and/or the needs of the implementation. In one example, the classification may simply be the proximity value that has been determined for each object insertion opportunity. Where the proximity value is a rankable value (for example, a number on the scale described above), this may allow the object insertion opportunities to be ranked at a later time, such that the most promising object insertion opportunities may be further analysed/used first.

In a further example, the classification may be to assign each of the object insertion opportunities into one of a plurality of different classes. For example, the classes may comprise 'candidate object insertion opportunity' and 'rejected object insertion opportunity', as described earlier. The classification may be performed based on the proximity value, for example by comparing the proximity value against one or more different thresholds. For example, a relatively high proximity value may indicate that an inserted visual object would be clearly visible and a relatively low proximity value may indicate that an inserted visual object would not be very clearly visible. If it is desired for the inserted visual object to be clearly visible to a large range of viewers (for example, viewers with a wide range of eye sights and/or viewing the video from a wide range of distances), any object insertion opportunities having a proximity value exceeding a threshold may be classified as candidate object insertion opportunities and any object insertion opportunities having a proximity value below the threshold may be classified as rejected object insertion opportunities. Conversely, if it is desired for inserted objects not to be so clearly visible to viewers (for example, if it is desired for the visual object to add to the overall texture of the image, but not distract the viewer), any object insertion opportunities having a proximity value exceeding a threshold may be classified as rejected object insertion opportunities and any object insertion opportunities having a proximity value below the threshold may be classified as candidate object insertion opportunities. In a further possibility, if it is desired for inserted objects to be quite clearly visible, but not so much as to be distracting, two thresholds may be used, where object insertion opportunities having a proximity value between the two thresholds may be classified as candidate object insertion opportunities and object insertion opportunities having a proximity value below both thresholds or above both thresholds may be classified as rejected object insertion opportunities. It will be appreciated that where there are more than two different possible classifications (for example, there may be a third classification of 'borderline object insertion opportunity', indicating an opportunity that is not quite as good as a candidate object insertion opportunity, but is too good to be rejected immediately), even more thresholds may be used.

In a further example alternative, thresholds may not be used, but instead the object insertion opportunities with the best n proximity values (for example, the best five, or the best 10, or the best 20, etc.), may be classified as candidate object insertion opportunities, with the remaining object insertion opportunities being classified as rejected.

It will be appreciated from the above that classification based on the proximity value may be performed in any suitable way depending on the nature of the proximity values and the desired outcomes of the classification, and the above examples are non-limiting examples of some particular implementations that could be used.

By performing classification in this way, object insertion opportunities may be analysed and assessed automatically, with improved speed, efficiency and consistency. This means that the entire process of visual object insertion can be made more efficient, since resources can be focused on detailed analysis and/or object insertion on suitable opportunities, without having to invest considerable time and resources in identifying those suitable opportunities in the first place.

Optionally, an impact value for each identified object insertion opportunity may also be determined and the classification may be further based on the determined impact value. The impact value may provide a quantification of the extent of visual impact, or visual impression, that a visual object inserted in the location of the object insertion opportunity may have a viewer (indicating, for example, how likely the viewer might be to notice the inserted visual object). The impact value may be based on a number of different characteristics of the object insertion opportunity, for example any one or more of: the size of the object insertion opportunity, the size of a visual object to be inserted, the proximity value, the determined value(s) of one or more distance parameters, the position of the object insertion opportunity within the frame, the position of the focus of attention within the frame, and/or the characteristics of the focus of attention (for example, person, lead character, secondary character, object, etc.). For example, if the impact value is set so that larger values indicate a larger potential visual impact (i.e., a viewer is more likely to notice the inserted visual object), proximity values indicating a shorter distance to the focus of attention may increase the impact value compared with proximity values indicating a larger distance to the focus of attention. Likewise, larger sizes of object insertion opportunity and/or larger sizes of visual object to be inserted may increase the impact value in this example.

In an optional final Step S250, a visual object insertion process may take place for one or more of the object insertion opportunities that have been classified as suitable for visual object insertion (in whatever form the classification may take). The skilled person will understand how to perform visual object insertion either automatically or manually, details of which shall not be disclosed herein as it is not the focus of the present disclosure. However, it will be appreciated that this step is optional, since the technical benefits of more efficient and consistent object insertion opportunity classification will still be realised even if visual object insertion does not ultimately take place (for example, because on further detailed investigation, it is decided not to insert a visual object). By way of example, by classifying the object insertion opportunities, a human operator may only need to analyse a small number of suitable opportunities in detail (for example, 5, or 10, or 20), rather than the large number of opportunities (for example, 100, 500, 1000, etc.).

Optionally, a mock-up of the candidate object insertion opportunities may be created (optionally automatically) by rendering preview imagery (often at a lower than final resolution) which may have a blue box or cylinder in the imagery to represent the (as yet undetermined) visual object to be inserted. This may assist in further assessing the value of the opportunity for digital object insertion, by allowing the positioning of the digitally inserted object to be visualised. Optionally, an evaluation report on the opportunity may also be created, for example listing how much total time over how many scenes the digitally inserted object can be seen. The video may be part of a series of videos (for example, the video may be one episode, or show, in a series, or season, of a television program), meaning that the same scenes, locales, and characters may reappear in each episode or show. In such a situation, the evaluation report may span some or all of the episodes/shows in the series/season, so that the candidate object insertion opportunity may be appreciated across the multiple episodes/shows.

Figure 5:
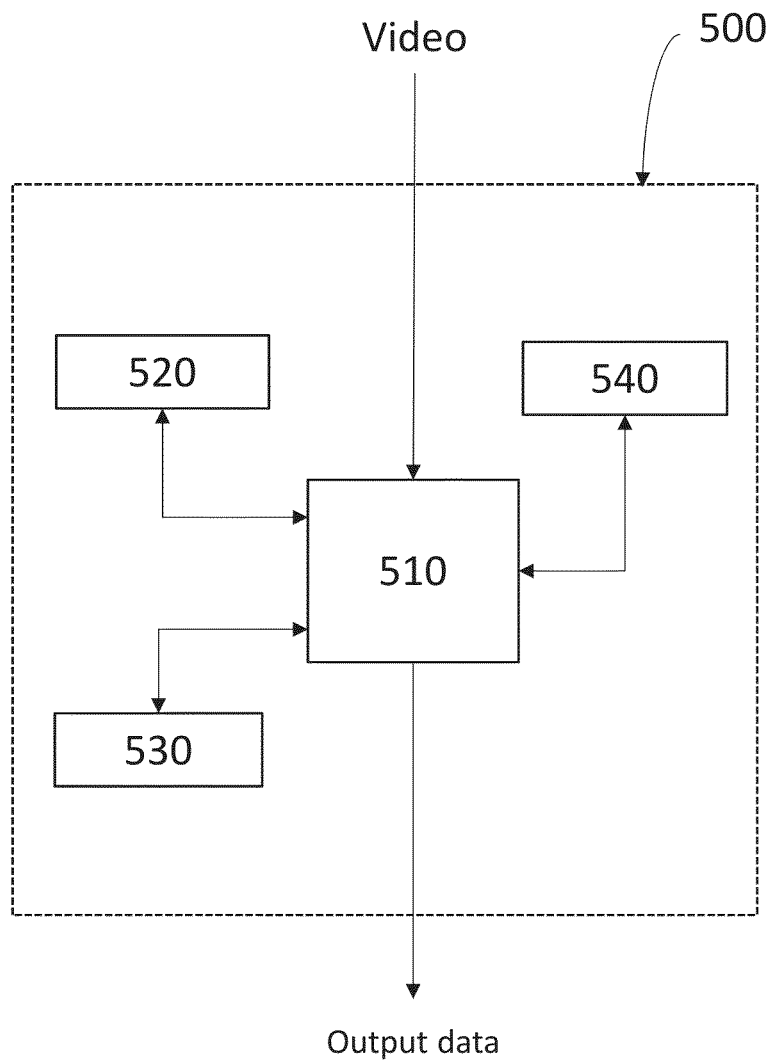
FIG. 5 shows an example conceptual system configured to perform the method of FIG. 2.

FIG. 5 shows an example conceptual classification system 500 configured to perform the processes disclosed above. The system 500 is configured to receive a video to be analysed for classification of object insertion opportunities. The system 500 is represented as comprising a central hub 510 that interfaces with an identification module 520, a proximity value determination module 530 and a classification module 540. The central hub 510 may be configured to pass at least part of the video to the identification module 520, which performs steps S210 and S220 described above and returns an indication of each identified object insertion opportunity and the focus of attention (for example, by appending metadata identifying each object insertion opportunity and focus of attention, such as by pixel labelling in the at least part of the video). The central hub 510 may then pass that at least part of the video and the indication of each identified object insertion opportunity and focus of attention to the proximity value determination module 530, which performs step S230 described above and returns an indication of the proximity value determined for each object insertion opportunity (for example, by including the proximity value(s) in any metadata associated with the video). In an alternative, the proximity value determination module 530 may identify the object insertion opportunity (or opportunities) and focus of attention for itself (for example, in one of the AI implementations described below), in which case the identification module 520 may be omitted and the proximity value determination module 530 may simply obtain at least part of the video from the central hub 150. Finally, the central hub 510 may pass at least the proximity value(s) to the classification module 540, which performs Step S240 described above and returns the classifications. The central hub 510 may then output any necessary data to a different system or module (such as a visual object insertion system/module), such as data indicative of the object insertion opportunities and their classifications, or data indicative of object insertion opportunities that have a particular classification (such as candidate object insertion opportunities). The central hub 510 may optionally also output the video to the different system or module, although in an alternative the different system or module may already have a copy of the video, or may be able to obtain the video from elsewhere.

It will be appreciated that this is merely one example conceptual representation of how the system 500 may be configured and it may be configured in any other way suitable for perform the steps of the processes described above. For example, each of the hub and the modules may be implemented as separate software modules, or the functionality of one or more of the hub and modules may be combined into a single software module. In a further alternative, the functionality of any one or more of the hub and modules may be divided between two or more different software modules.

Each of the modules of the conceptual system 500 may comprise an AI algorithm or functionality, such as a Convolutional Neural Network (CNN) and/or Support Vector Machine (SVM) and/or Classical and Regression Trees (CART) and/or Naïve Bayesian-Principle Component Analysis and/or any other suitable AI algorithm/technique, that can be trained appropriately to perform its relevant process described above.

Figure 6:
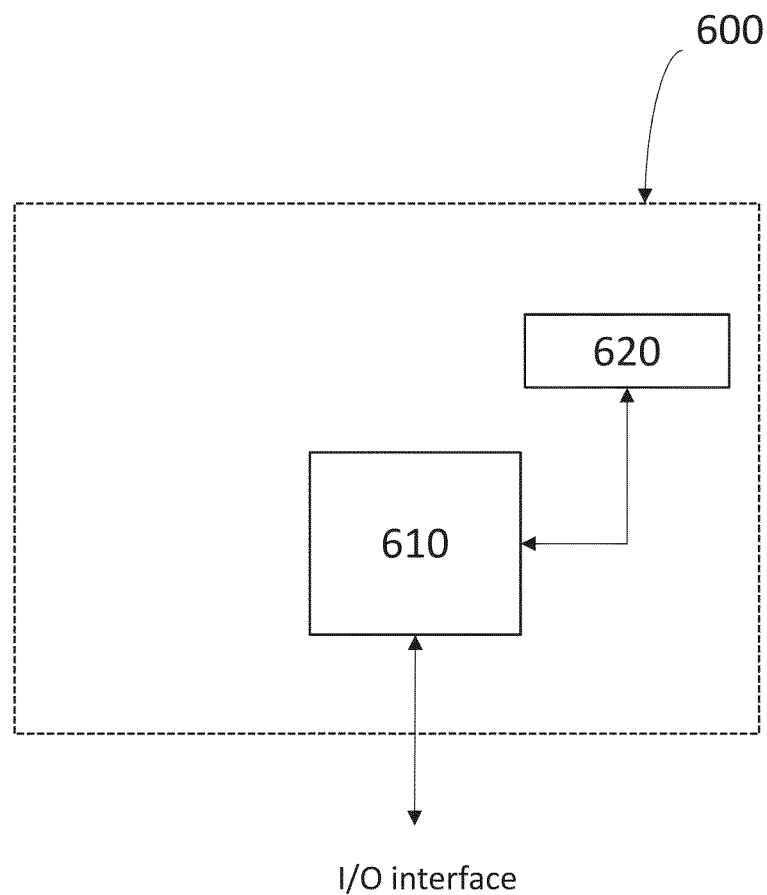
FIG. 6 shows an example data processing system for implementing the conceptual system of FIG. 5.

FIG. 6 shows an example data processing system 600 for performing the processes described above. The system 600 comprises a processor 610, such as a microprocessor, and a memory module 620, such as volatile or non-volatile memory, that interfaces with the processor 610. The memory module 620 may comprise a computer program configured to perform the processes described above when executed on the processor 610. The processor 610 may receive and output any necessary data via an I/O interface, such as the video to be analysed and the classification of object insertion opportunities. Whilst a single processor 610 and memory element 620 is disclosed, it will be appreciated that the system 600 may comprise one or more processors and one or more memory elements, which may be co-located or located in different geographical places, for example as a distributed network or cloud computing environment. The hub and modules of the conceptual system 500 described above may be implemented by the one or more processor and one or more memory module of system 600.

Whilst FIGS. 5 and 6 show direct connections between each of the different entities and modules, it will be appreciated that there may be any number of intermediate entities or modules as part of those interfaces.

Figure 7:
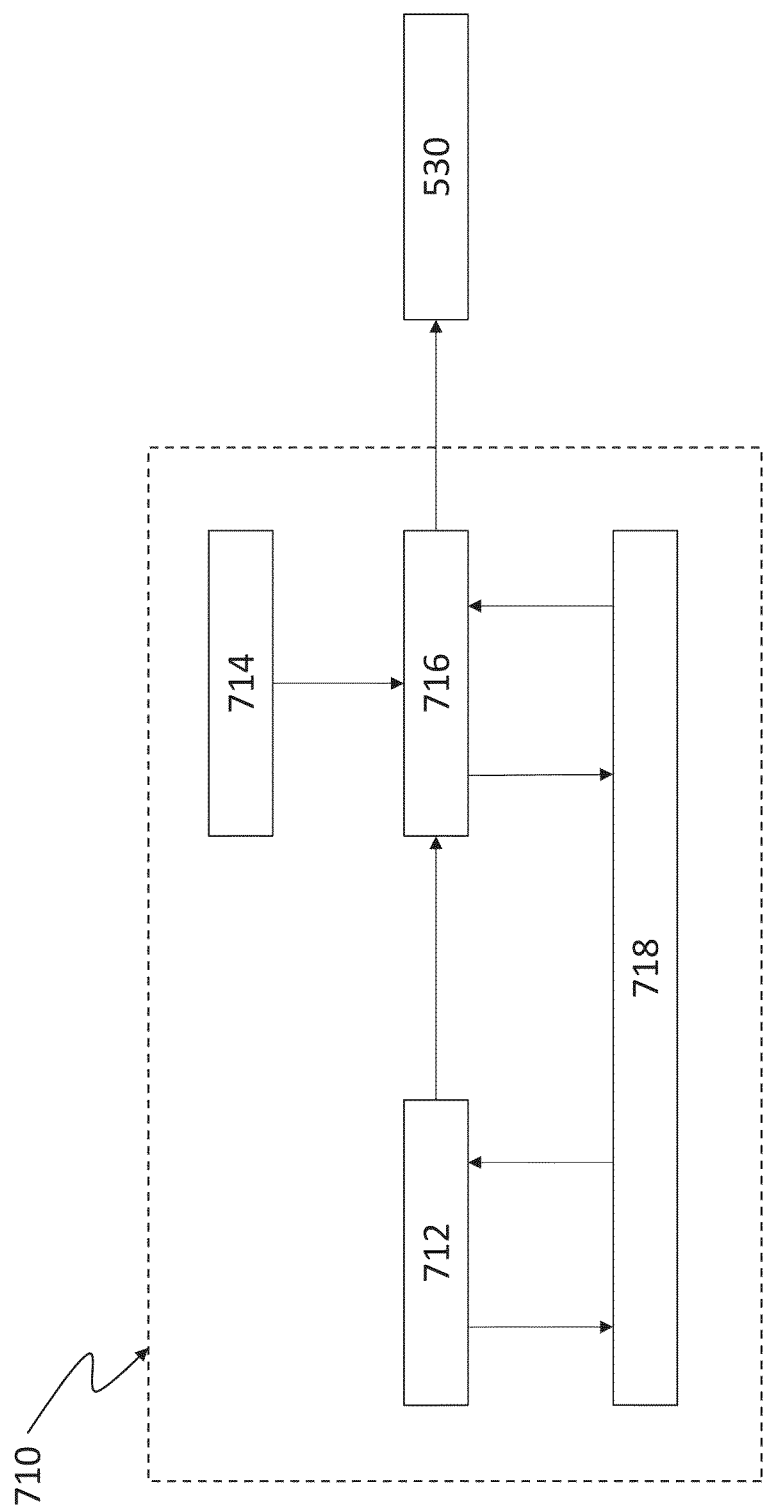
FIG. 7 shows an example technique for training an AI algorithm in accordance with an aspect of the present disclosure.

FIG. 7 shows an example technique for training an AI algorithm, such as a machine learning algorithm, that can then be used as part of the proximity value determination module 530. An AI training phase system 710 is represented along with the proximity value determination module 530. The AI training phase system 710 may be used to train an AI algorithm that is then used by the proximity value determination module 530 to determine proximity values for object insertion opportunities in scenes of videos comprising at least one object insertion opportunity and a focus of attention.

The AI training phase system 710 may comprises a data and pre-processing module 712, an AI algorithm module 714, a training algorithm module 716 and an underlying architecture/platform 718 on which the training is carried out. The data and pre-processing module 722 may comprise a corpus of training images, each comprising a focus of attention in the visual content of the image, at least one object insertion opportunity in the visual content of the image and a corresponding value for at least one distance parameter and/or a corresponding proximity value. The values of at least some of the distance parameters and/or proximity values may have been determined at least in part by one or more humans at an earlier time, for example they may be a value on a, such as the scale of 0-4 described above. The data and pre-processing module may have obtained the corpus of training images in any suitable way, for example by retrieving it from a store of previously analysed images, or by passing a plurality of videos/images through the identification module 520 and optionally having a human determine the values for the distance parameters and/or proximity values, etc.

The AI algorithm module 714 may comprise any known algorithm such as a convolution neural network, CNN, or a support vector machine, SVM, or the like.

The training algorithm module 716 may apply the corpus of training images to the AI algorithm module 714, such that the AI algorithm can learn patterns between the visual content of images and the distance parameter values and/or proximity values. For example, if the AI algorithm module 714 is CNN based or the like, a training algorithm may be used that comprises back propagation with stochastic gradient decent. In a further example, if the AI algorithm is SVM based, a training algorithm may be used that comprises the use of known methods such as quadratic programming. In some instances, the AI algorithm module 724 can be trained to receive one or more frames relating to one or more scenes and also identification of the object insertion opportunities and focus of attention (identified, for example, by the identification module 520), and determine values for the distance parameter and/or proximity values. In other instances, the AI algorithm may be trained to identify for itself object insertion opportunities and/or the focus of attention in scenes of videos, and then determine values for the distance parameter and/or proximity values.

As the skilled person will appreciate, the underlying architecture/platform 718 may comprise any suitable conventional computing device, for example comprising one or more GPUs and may optionally be implemented as a distributed network of computing devices. One example architecture/platform that may be used is described above with reference to FIG. 6.

The training algorithm module 716 may then output the trained algorithm to the proximity value determination module 530. Consequently, the proximity value determination module 530 may then use the trained algorithm to analyse image content in at least one frame of a scene of a video and determine a value(s) for a distance parameter(s) for object insertion opportunities identified in the scene of the videos (based on which proximity values may then be determined, for example by simply setting the proximity value to the determined value of the distance parameter, or by using a different algorithm, such as one that combines the distance parameter value of a two-dimensional distance and/or the distance parameter value of a three dimensional distance and/or any other suitable values)), and/or may use the trained algorithm to determine directly proximity values for object insertion opportunities identified in scenes of videos (depending on how the algorithm has been trained). In this way, the proximity value determination module 530 may use AI to determine values for distance parameters and/or proximity values for scenes of videos.

The skilled person will readily appreciate that various alterations or modifications may be made to the above described aspects of the disclosure without departing from the scope of the disclosure.

The aspects of the present disclosure described in all of the above may be implemented by software, hardware or a combination of software and hardware. The functionality described above may be implemented by software comprising computer readable code, which when executed on the processor of any electronic device, performs the functionality. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The computer-readable medium may be distributed over network-coupled computer systems so that the computer readable instructions are stored and executed in a distributed way.

Whilst the present disclosure is focused primarily on a processes comprising the Steps S210-S240 described with reference to FIG. 2 and a system 500 configured to perform those steps, it should be appreciated that in an alternative, an apparatus or module may be configured only to perform Steps S230 and S240. For example, the classification module 540 may be a standalone hardware and/or software entity that obtains (for example, by receiving from a different entity/module, or by retrieving from a different entity/module/data store) object insertion data comprising: one or more frames of a scene of the video; data indicative of at least one object insertion opportunity in the scene of the video (for example, metadata associated with the video/one or more frames of the video, that identifies the at least one object insertion opportunity, such as by pixel labelling) and data indicative of a focus of attention in the scene (for example, metadata associated with the video/one or more frames of the video, that identifies the focus of attention, such as by pixel labelling).

It is claimed:

1. A system for classifying portions of existing video for insertion of objects into the existing video, the system including a processor and memory, with the processor executing instructions which cause the processor to operate as a classification system using a machine learning algorithm trained using a corpus of training images, wherein each of the training images includes a training focus of attention, at least one training object insertion opportunity and a corresponding at least one training proximity value provided by a human analysis of the training images, the classification system configured to:

identify, by analysing a plurality of pixels in each of one or more frames in a scene of the video, at least one object insertion opportunity in the scene of the video, wherein each object insertion opportunity represents an opportunity to digitally insert one or more visual objects into an image content of the scene;

identify, by analysing the plurality of pixels in each of the one or more frames in the scene of the video, a focus of attention in the scene, wherein the focus of attention represents a part of the scene that is likely to draw a viewer's focus of attention;

determine a proximity value for each of the at least one object insertion opportunity based at least in part on a region of the scene covered by the object insertion opportunity and a region of the scene covered by the focus of attention, wherein the proximity value is indicative of a distance between the respective at least one object insertion opportunity and the focus of attention in the scene;

classify each of the at least one object insertion opportunity as a candidate object insertion opportunity or a rejected object insertion opportunity based at least in part on the determined proximity value determined for each respective at least one object insertion opportunity;

identify a preferred candidate object insertion opportunity, from the classification of each of the at least one object insertion opportunity, for insertion of a digitally inserted object; and alter the video at the preferred candidate object insertion opportunity.

2. The system of claim 1, wherein classifying each of the at least one object insertion opportunity comprises classifying each of the at least one object insertion opportunity as a candidate object insertion opportunity or a rejected object insertion opportunity.

3. The system of claim 2, wherein classifying each of the at least one object insertion opportunity further comprises determining an impact value for each candidate object insertion opportunity based at least in part on its associated proximity value.

4. The system of claim 1, wherein the proximity value is determined by steps comprising: determining a value for a distance parameter based on the region of the scene covered by the respective at least one object insertion opportunity and the region of the scene covered by the focus of attention; and determining the proximity value based at least in part on the value for the distance parameter.

5. The system of claim 4, wherein the distance parameter comprises a two dimensional relative distance between the region of the scene covered by the respective at least one object insertion opportunity and the region of the scene covered by the focus of attention.

6. The system of claim 4, wherein the distance parameter comprises a three dimensional relative distance between the region of the scene covered by the respective at least one object insertion opportunity and the region of the scene covered by the focus of attention.

7. The system of claim 4, wherein the distance parameter comprises a relative depth between the region of the scene covered by the respective at least one object insertion opportunity and the region of the scene covered by the focus of attention.

8. The system of claim 4, wherein the distance parameter comprises a scale indicative of a distance between the region of the scene covered by the respective at least one object insertion opportunity and the region of the scene covered by the focus of attention.

9. The system of claim 8, wherein determining the value of the distance parameter comprises using an artificial intelligence, AI, algorithm trained using a corpus of training images, wherein each of the training images comprises a focus of attention, at least one object insertion opportunity and, for each object insertion opportunity, a value on the scale.

10. The system of claim 1, wherein the distance between the respective at least one object insertion opportunity and the focus of attention in the scene comprises one or more of: a) a distance between a centre of gravity of the respective object insertion opportunity and a centre of gravity of the focus of attention; b) a distance between a centre of gravity of the respective object insertion opportunity and an edge of the focus of attention; c) a distance between an edge of the respective object insertion opportunity and a centre of gravity of the focus of attention; and d) a distance between an edge of the respective object insertion opportunity and an edge of the focus of attention.

11. A method for classifying portions of existing video for insertion of objects into the existing video, the method includes:
   training a classification system using an artificial intelligence using a corpus of training images, wherein each of the training images includes a training focus of attention, at least one training object insertion opportunity and a corresponding at least one training proximity value provided by a human analysis of the training images, where the classification system is configured to:
   identifying, using the classification system by analysing a plurality of pixels in each of one or more frames in a scene of the video, at least one object insertion opportunity in the scene of the video, wherein each object insertion opportunity represents an opportunity to digitally insert one or more visual objects into an image content of the scene;
   identifying, using the classification system by analysing the plurality of pixels in each of the one or more frames in the scene of the video, a focus of attention in the scene, wherein the focus of attention represents a part of the scene that is likely to draw a viewer's focus of attention;
   determining, using the classification system, a proximity value for each of the at least one object insertion opportunity based at least in part on a region of the scene covered by the object insertion opportunity and a region of the scene covered by the focus of attention, wherein the proximity value is indicative of a distance between the respective at least one object insertion opportunity and the focus of attention in the scene;
   classifying, using the classification system, each of the at least one object insertion opportunity as a candidate object insertion opportunity or a rejected object insertion opportunity based at least in part on the determined proximity value;
   determining, using the classification system, for each respective at least one object insertion opportunity;
   identify, using the classification system, a preferred candidate object insertion opportunity, from the classification of each of the at least one object insertion opportunity, for insertion of a digitally inserted object; and
   altering, the classification system, the video at the preferred candidate object insertion opportunity.

12. A computer program, stored on non-transitory storage medium, comprising instructions which, when the program is executed on at least one processor cause the at least one processor to operate as a classification system using an artificial intelligence trained using a corpus of training images, wherein each of the training images includes a training focus of attention, at least one training object insertion opportunity and a corresponding at least one training proximity value provided by a human analysis of the training images, the classification system configured to:
   identify, by analysing a plurality of pixels in each of one or more frames in a scene of the video, at least one object insertion opportunity in the scene of the video, wherein each object insertion opportunity represents an opportunity to digitally insert one or more visual objects into an image content of the scene;
   identify, by analysing the plurality of pixels in each of the one or more frames in the scene of the video, a focus of attention in the scene, wherein the focus of attention represents a part of the scene that is likely to draw a viewer's focus of attention;
   determine a proximity value for each of the at least one object insertion opportunity based at least in part on a region of the scene covered by the object insertion opportunity and a region of the scene covered by the focus of attention, wherein the proximity value is indicative of a distance between the respective at least one object insertion opportunity and the focus of attention in the scene;
   classify each of the at least one object insertion opportunity as a candidate object insertion opportunity or a rejected object insertion opportunity based at least in part on the determined proximity value determined for each respective at least one object insertion opportunity
   identify a preferred candidate object insertion opportunity, from the classification of each of the at least one object insertion opportunity, for insertion of a digitally inserted object; and
   alter the video at the preferred candidate object insertion opportunity.

13. The computer program of claim 12, wherein the distance parameter comprises a relative depth between the region of the scene covered by the respective at least one object insertion opportunity and the region of the scene covered by the focus of attention.

14. The computer program of claim 12, wherein the distance parameter comprises a scale indicative of a distance between the region of the scene covered by the respective at least one object insertion opportunity and the region of the scene covered by the focus of attention.

15. The computer program of claim 12, wherein the distance between the respective at least one object insertion opportunity and the focus of attention in the scene comprises one or more of: a) a distance between a centre of gravity of the respective object insertion opportunity and a centre of gravity of the focus of attention; b) a distance between a centre of gravity of the respective object insertion opportunity and an edge of the focus of attention; c) a distance between an edge of the respective object insertion opportunity and a centre of gravity of the focus of attention; d) a distance between an edge of the respective object insertion opportunity and an edge of the focus of attention.

16. The computer program of claim 12, wherein classifying each of the at least one object insertion opportunity comprises classifying each of the at least one object insertion opportunity as a candidate object insertion opportunity or a rejected object insertion opportunity.

17. The computer program of claim 16, wherein classifying each of the at least one object insertion opportunity further comprises determining an impact value for each candidate object insertion opportunity based at least in part on its associated proximity value.

* * * * *